Patented Jan. 13, 1931

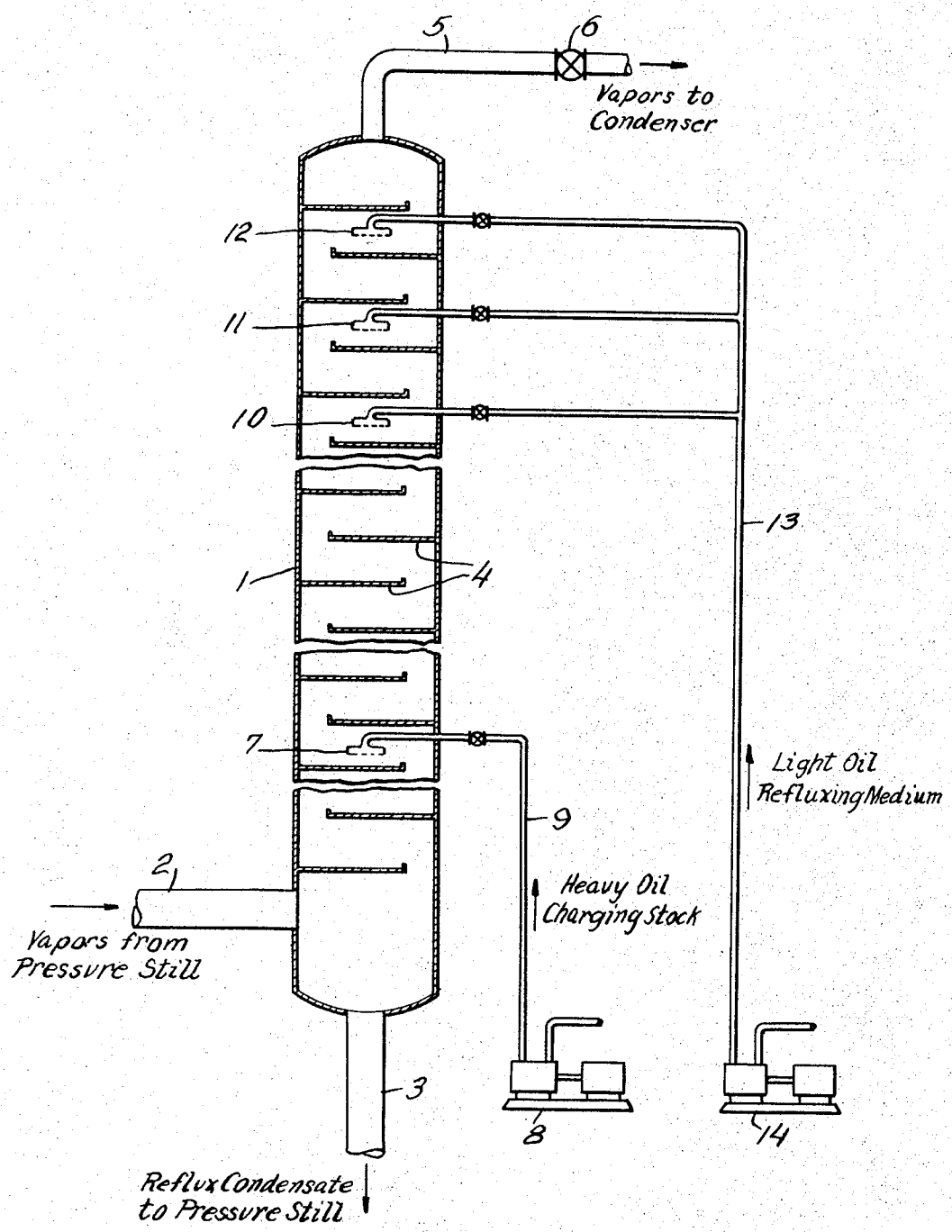

1,789,072

UNITED STATES PATENT OFFICE

EUGENE C. HERTHEL, OF CHICAGO, ILLINOIS, ASSIGNOR TO SINCLAIR REFINING COMPANY, OF NEW YORK, N. Y., A CORPORATION OF MAINE

ART OF CRACKING HYDROCARBONS

Application filed January 4, 1928. Serial No. 244,440.

This invention relates to improvements in the operation of reflux condensers employed in connection with pressure stills for cracking heavier and higher boiling hydrocarbon oils, such as gas oil, for the production of lighter and lower boiling hydrocarbon oils, such as gasoline and gasoline-containing pressure distillates.

In an application filed July 27th, 1927, Serial No. 208,741, which has matured into Patent No. 1,755,601, April 22, 1930, there is described an improved method of operating such reflux condensers, that method comprising the introduction of a light oil refluxing medium at a number of points along the path of vapor travel through the reflux condenser instead of within a closely localized region, the proportion of light oil introduced at each of these points being regulated to distribute and to make more uniform the cooling and condensation effected in the reflux condenser and to distribute and to make more uniform the heat transfer between heavier components of the vapors and lighter components of the liquids in the reflux condenser. One of the important advantages of this method of operation is reduction or elimination of the tendency of the condensed heavier constituents forming the reflux condensate to carry back to the pressure still with them lighter constituents suitable as components of the desired product, with corresponding reduction or elimination of any tendency toward over-cracking of such lighter constituents.

As pointed out in this prior application, it is common practice in the operation of pressure cracking stills to subject the vapors from the still to some refluxing operation to condense from the vapors for return to the still heavier constituents unsuitable as components of the desired product but which by further treatment will yield additional quantities of constituents suitable as components of the desired product, one type of such refluxing operation being carried out with the introduction into direct contact with the vapors from the pressure still in a reflux condenser of a light oil which largely or completely vaporizes at the temperature and under the pressure prevailing in the refluxing operation. In another type of refluxing operation commonly employed, raw oil to be supplied to the pressure distillation, or part of it, is introduced into direct contact with the vapors from the pressure still in a reflux condenser, the vapors being cooled and the heavier constituents condensed by the consequent heat exchange while the raw oil is preheated and any lighter constituents suitable as components of the desired product are vaporized to escape with the uncondensed vapors from the reflux condenser.

This type of refluxing operation, with direct introduction of raw oil into the vapors from the pressure still in a reflux condenser, has certain disadvantages as well as advantages. For example, as commonly practiced in many instances, entrainment of a portion of the raw oil in the vapors escaping from the reflux condenser and consequent contamination of the distillate is involved, and the amount and the temperature of raw oil so introduced into the reflux condenser are subject to close limitations as otherwise the vapors in the reflux condenser are cooled too much or not enough. Likewise, if additional raw oil is supplied directly to the pressure still, any light constituents it may contain may be subjected to over-cracking with the same objectionable incidents involved in over-cracking of light constituents entrained in reflux condensate from the vapors subjected to the refluxing operation.

It has also been proposed to combine these types of refluxing operations, introducing raw oil at an intermediate point and introducing some light oil at a more remote point in the path of vapor travel through the reflux condenser. The present invention relates particularly to improvements in such operations, that is to improvements in the operation of reflux condensers employed in connection with pressure stills for cracking hydrocarbon oils in which raw oil is introduced at an intermediate point and some light oil at a more remote point in the path of vapor travel therethrough.

According to the present invention, the raw oil to be supplied to the pressure distillation is introduced at an intermediate point or points in the path of vapor travel and a light oil refluxing medium is introduced at a number of points distributed along the subsequent path of vapor travel into a reflux condenser in which the vapors from the pressure still are subjected to a refluxing operation. By introducing the light oil refluxing medium, an oil vaporizing substantially completely in the refluxing operation, at a number of distributed points instead of in a closely localized region extreme concentration of the cooling consequent to vaporization of the light oil is avoided. Thus, a more uniform temperature gradient can be maintained along the path of vapor travel through the reflux condenser. The raw oil introduced into the reflux condenser consequently can be introduced at a point where it assists in maintaining the desired temperature gradient without involving either entrainment of lighter constituents suitable as components of the desired product in the oil mixture flowing from the reflux condenser to the pressure still or entrainment of heavier raw oil constituents in the vapors escaping from the reflux condenser. In any particular operation, an increased amount of raw oil can be introduced into the refluxing operation simply by introducing the raw oil at a point nearer in the path of vapor travel to the inlet to the reflux condenser, and similarly, raw oil of higher temperature can be introduced into the refluxing operation simply by introducing the raw oil at a point nearer in the path of vapor travel to the inlet to the reflux condenser while maintaining the composition and boiling range of the escaping vapors as desired. In this combined operation, distribution of the introduction of the light oil refluxing medium, is of special advantage in providing accuracy of control, uniformity of operation, and in securing maximum capacity. In one aspect the introduction of raw oil at a separate point or points in advance, in the path of vapor travel, of the several points of introduction of the light oil refluxing medium is an extension of the distribution of the introduced refluxing media, acting further to distribute and to make more uniform the cooling and condensation effected in the reflux condenser and to distribute and to make more uniform the heat transfer between the vapors and the refluxing media.

This invention will be further described in connection with the accompanying drawing which illustrates, diagrammatically and conventionally, a reflux condenser, shown in fragmentary elevation and partly in section, adapted, in connection with a pressure cracking still, for carrying out the invention.

Referring to the drawing, the reflux condenser 1 is connected to a pressure cracking still by the vapor line 2 and the reflux return line 3. The tower is provided interiorly with baffles 4. Vapors from the still enter the lower part of the tower through the line 2 and pass upwardly through the tower back and forth between the several baffles. Vapors remaining uncondensed escape from the upper end of the tower through connection 5, and through it are conducted to a condenser where the distillate product is condensed and collected. Pressure in the still system may be maintained through the reflux tower and regulated, for example, by means of valve 6 in the vapor connection between the reflux tower and the final condenser. For the production of gasoline from gas oil, for example, the pressure in the system may amount to as much as 100 pounds per square inch, 150 pounds, 300 pounds or more. Raw oil to be supplied to pressure still is introduced into the lower part of the tower through the spray head 7 by means of the pump 8 and the valved connection 9. Arranged in the upper part of the reflux tower, at points spaced a substantial distance along the path of vapor travel defined by the baffles, are three spray heads for the introduction of the light refluxing medium designated 10, 11 and 12. These three spray heads are connected to a common supply line 13 through which the light oil refluxing medium is supplied by means of the pump 14. A light oil which is vaporized substantially completely under the conditions prevailing in that zone of the tower above the spray head 7, for example, a portion of the pressure distillate from the operation or an oil of corresponding character, is introduced through these spray heads into the tower in contact with the vapors flowing upwardly through the tower.

As the hot vapors from the pressure still entering through line 2 pass upwardly through the tower, they are first contacted with the raw oil introduced through spray head 7. The vapors from the pressure still are thereby partially cooled and the raw oil is, in turn, heated by the heat exchange. Lighter constituents of the raw oil may also be vaporized to pass upwardly through the tower together with the uncondensed vapors from the pressure still. The unvaporized portion of the raw oil, together with the heavy condensed constituents of the vapors from the pressure still, pass downwardly through the tower in contact with the ascending hot vapors. The vapors from the pressure still uncondensed by heat exchange with the raw oil, together with such lighter constituents as were vaporized from the raw oil, flow on upwardly through the tower to be further cooled and condensed by heat exchange with the light oil refluxing medium introduced through the spray heads 10, 11 and 12. The resulting condensate flows downwardly through the tower over the baffles in contact with the rising vapors, this continued heat exchange further vaporizing lighter constituents of the condensate and condensing heavier constituents of the vapors.

It will be apparent that the invention provides for improved uniformity of distribution of the heat exchange and consequent vaporization and condensation along the path of vapor travel through the reflux condenser, and this more uniform distribution of heat exchange assists in increasing the capacity of the reflux condenser as well as in improving the accuracy of the fractionation secured. Where either raw oil to be supplied to the cracking operation or a light oil refluxing medium is introduced in a closely localized region there is a corresponding tendency toward condensation in that region of both lighter and heavier constituents of the vapors while both heavier and lighter constituents remain uncondensed, although this tendency is less marked in the case of raw oil than of a light oil refluxing medium. By distributing the introduction of the light oil refluxing medium and the raw oil, acting as a refluxing medium, in accordance with this invention, however, condensation of heavier constituents without condensation of lighter constituents is promoted while at the same time better opportunity is afforded for revaporization from condensate or vaporization from raw oil of any entrained lighter constituents. Entrainment of heavier constituents in the vapors escaping from the reflux condenser is also minimized by this distribution of the introduction of the refluxing medium.

The oil mixture including heavier constituents condensed from the vapors and the unvaporized raw oil flows from the lower end of the reflux tower back to the pressure still through line 3. The return connection to the pressure still may include a pump or other forcing means for introducing this oil mixture into the pressure still.

In carrying out the present invention, the light oil refluxing medium supplied through spray heads 10, 11, and 12 in the upper part of the reflux tower may be distributed for example, approximately equally through each of these spray heads, or a greater proportion of the light oil refluxing medium may be introduced through the spray head 11 than through spray heads 10 or 12, or a somewhat greater proportion of the light oil refluxing medium may be introduced through spray head 10 than through 11 and in turn through 11 than through 12. The point or points at which raw oil is introduced into the reflux tower is best determined by the temperature and the amount of the raw oil so to be introduced. This point should be lower as the temperature or as the amount of raw oil to be introduced increases.

In carrying out the present invention, the raw oil introduced into the reflux tower may be preheated, for example, by indirect heat exchange with the vapors escaping from the reflux tower or by indirect heat exchange with tar or residue discharged from the pressure still. In one aspect, this invention enables raw oil so supplied to the pressure distillation to be preheated to a higher temperature. In another aspect, by preheating the raw oil, this invention enables a larger proportion of the raw oil to be supplied to the pressure distillation through the refluxing operation. Light constituents of the raw oil suitable as components of the desired product may thus be vaporized from the raw oil before it is subjected to the cracking conditions maintained in the heating zone in the pressure still, over-cracking of such raw oil constituents thus being avoided as well as over-cracking of similar light constituents which might be entrained from the vapors from the pressure still.

I claim:

In refluxing operations employed in conjunction with the cracking of hydrocarbon oils by distillation under pressure, the improvement which comprises passing the vapors from the pressure distillation through a reflux condenser introducing into the reflux condenser in direct contact with the vapors passing therethrough at an intermediate point in the path of vapor travel raw oil to be supplied to the pressure distillation, introducing into the reflux condenser in direct contact with the vapors passing therethrough at a plurality of points spaced a substantial distance further along the path of vapor travel a light oil that is vaporized substantially completely under the conditions prevailing in the reflux condenser, and returning the oil mixture including condensate and unvaporized raw oil from the reflux condenser to the pressure distillation, whereby entrainment in the reflux condensate of light constituents suitable as components of the desired distillate is reduced.

In testimony whereof, I have subscribed my name.

EUGENE C. HERTHEL.